United States Patent
Vasthimal et al.

(10) Patent No.: US 9,015,502 B2
(45) Date of Patent: Apr. 21, 2015

(54) SYSTEM AND METHOD FOR AUTOMATICALLY DETERMINING AN OPTIMAL POWER CAP VALUE

(75) Inventors: Deepak Kumar Vasthimal, Bangalore Karnataka (IN); Purshotam Shah, Bangalore Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 297 days.

(21) Appl. No.: 13/548,398

(22) Filed: Jul. 13, 2012

(65) Prior Publication Data

US 2014/0019779 A1     Jan. 16, 2014

(51) Int. Cl.
*G06F 1/00* (2006.01)
(52) U.S. Cl.
CPC ....................... *G06F 1/00* (2013.01)
(58) Field of Classification Search
CPC .................................... G06F 1/3203
USPC .................. 713/300, 310, 320, 330
See application file for complete search history.

(56) References Cited

U.S. PATENT DOCUMENTS

| | | | |
|---|---|---|---|
| 7,539,881 B2 | 5/2009 | Shaw et al. | |
| 2009/0119523 A1* | 5/2009 | Totten | 713/322 |
| 2010/0070787 A1* | 3/2010 | Bieswanger et al. | 713/322 |
| 2010/0235840 A1* | 9/2010 | Angaluri | 718/102 |
| 2012/0096248 A1* | 4/2012 | McCarthy | 713/1 |
| 2012/0302190 A1* | 11/2012 | McHenry | 455/226.3 |

* cited by examiner

*Primary Examiner* — Kim Huynh
*Assistant Examiner* — Paul J Yen
(74) *Attorney, Agent, or Firm* — Cooper Legal Group, LLC (57) ABSTRACT

Generating an optimal power cap value includes steps of: analyzing power usage of a system for a specified period of time; computing a power consumption value for the system for the specified period of time; and generating the optimal power cap value for the system, using the computed power consumption value. The system should be coupled with a power meter and should support power regulation technology.

8 Claims, 7 Drawing Sheets

```
Calculate deviation from Pavg for each
power consumption value
210
```
↓
```
discard all negative deviation values
220
```
↓
```
compute average of positive deviation
values
230
```
↓
```
Pcap = Pavg + Davg
240
```

SYSTEM AND METHOD FOR AUTOMATICALLY DETERMINING AN OPTIMAL POWER CAP VALUE

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of power saving technology, and more particularly relates to the field of determining an optimal power cap.

BACKGROUND OF THE INVENTION

In today's data centers, system administrators monitor the power consumption trends of a system using various power management software tools. There are hardware devices (cards) fitted into the system that can monitor/regulate/broadcast the amount of power consumed by the system. In order to save power and cooling costs, administrators can cap the power consumed by the system. Currently administrators are required to manually set the "power cap" value to control power consumption and thereby save power and hence cooling costs.

Currently there are no products that can automatically suggest an optimal power cap for a system.

SUMMARY OF THE INVENTION

Briefly, according to an embodiment of the invention a method for generating an optimal power cap value includes steps or acts of: analyzing power usage of a system for a specified period of time; computing a power consumption value for the system for the specified period of time; and generating the optimal power cap value for the system, using the computed power consumption value. The system includes a power meter and supports power regulation technology.

According to an embodiment of the present invention, computing the power consumption value includes computing an average power consumption of the system during the specified period of time. This is done by: recording average daily consumption values for each increment of time within the time period; summing the recorded average daily power consumption; and dividing the sum by the number of increments within the specified time period. Computing the power cap value includes steps of: calculating a deviation from the average power consumption value for each recorded average power consumption value; discarding all negative deviation values; computing an average of all positive deviation values; and calculating the optimal power cap value as a sum of the average power consumption value and the average of the positive deviation values.

According to another embodiment of the present invention, computing the power consumption value includes computing a peak power consumption of the system during the specified time period. This is done by: recording daily peak power consumption values for each increment of time within the time period; summing the recorded peak daily power consumption; and dividing the sum by the number of increments within the specified time period. Computing the power cap value includes steps of: calculating a deviation from the peak power consumption value for each recorded peak power consumption value; discarding all negative deviation values; computing an average of positive deviation values; and calculating the optimal power cap value as a sum of the peak power consumption value and the average of the positive deviation values.

According to another embodiment of the present invention, an information processing system for generating an optimal power cap value includes: a memory with computer-executable instructions stored therein, and a processor device operably coupled with the memory. The computer-executable instructions, when executed by the processor device, cause a computer to perform the method steps above.

According to another embodiment of the present invention, a computer program product includes a computer-readable storage medium with computer-executable instruction stored therein. The computer-executable instructions, when executed, cause a computer to perform the method steps as described above.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a method and system to recommend an optimal power cap value for servers. The method can potentially save power and cooling costs when compared to a manual power cap method. The method uses real-time data values for average and peak power consumption for computing power cap and hence the value suggested would actually affect power consumption thereby saving costs. The optimal power cap is computed based on the historical power consumption of the system. The power value is computed using real-time data based on average and/or peak power consumption of the server. The method provides two types of power cap values:

a) a power cap value based on average power consumption metrics, having an impact on system performance; and b) a power cap value based on peak power consumption metrics that may not have an impact on system performance.

According to an embodiment of the present invention, the method also provides an option to automatically apply the suggested power cap value to system. The systems that we envision benefitting from this method include, but are not limited to, data center servers, mobile devices, and commodity servers. It is a requirement that these systems support a power meter and power regulator technology.

The parameters to the power cap value system are:

1) Power Cap: limiting the execution capacity of a single server with the purpose of controlling the input power consumption of the server as part of data-center electrical supply management policy (Pcap).

2) Average Power Consumption: the average power consumed by the server in a given time interval (Pavg).

3) Peak Power Consumption: the peak power consumed by the server in a given time interval (Ppeak).

4) System: the system is any information processing system that supports a power meter and power regulator technology.

5) Power Meter/Regulator: a device that monitors/regulates/broadcasts the amount of power consumed by the system.

The proposed solution offers two different methods to generate a power cap; one method that can have an impact on system performance; and another method that does not have an impact on system performance. The client/customer can be involved in the decision as to which method to employ.

The present invention will now be described with respect to FIGS. 1 through 7, which are block diagrams and flowchart illustrations of embodiments of the present invention. It will be understood that each block of the flowchart illustrations and/or block diagrams, and combinations of blocks in the flowchart illustrations and/or block diagrams, can be implemented by computer program instructions as executed by a computer device.

Figure 6:
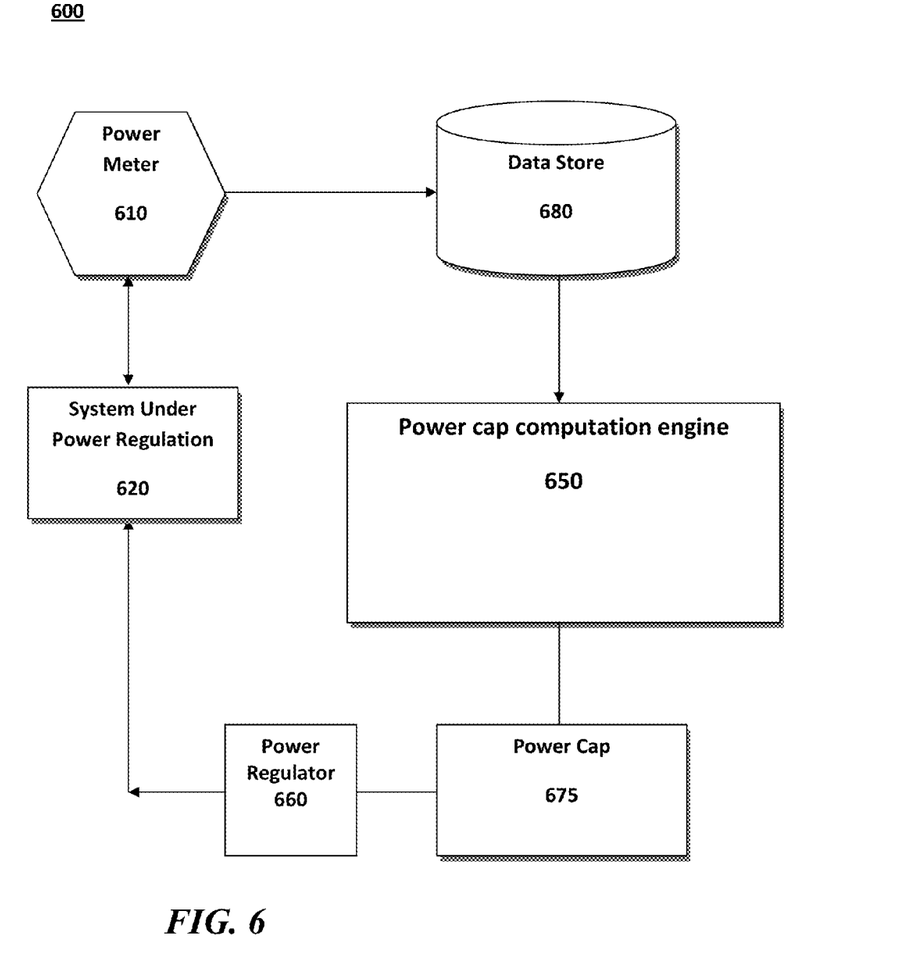
FIG. 6 is a simplified illustration of a system in which the present invention may be implemented, according to an embodiment of the present invention.

Referring now in specific detail to the drawings, and particularly to FIG. 6, we show a simplified depiction of a system configured to operate according to embodiments of the present invention. First we have the system 620 under power regulation. This system 620 is in operable communication with a power meter 610. Readings from the power meter 610 are stored in a data store 680 over a period of time. The power cap computation engine 650 uses these power meter readings to compute the power cap 675 for the system 620. As previously stated, the system 620 is any system that supports a power meter 610 and power regulator technology. In an optional embodiment of the present invention, the power cap computation engine 650 automatically applies the power cap 675 to the system 620 (through the system's power regulator 660) when it is determined that the power cap value 675 is an improvement over the current power usage value.

Figure 1:
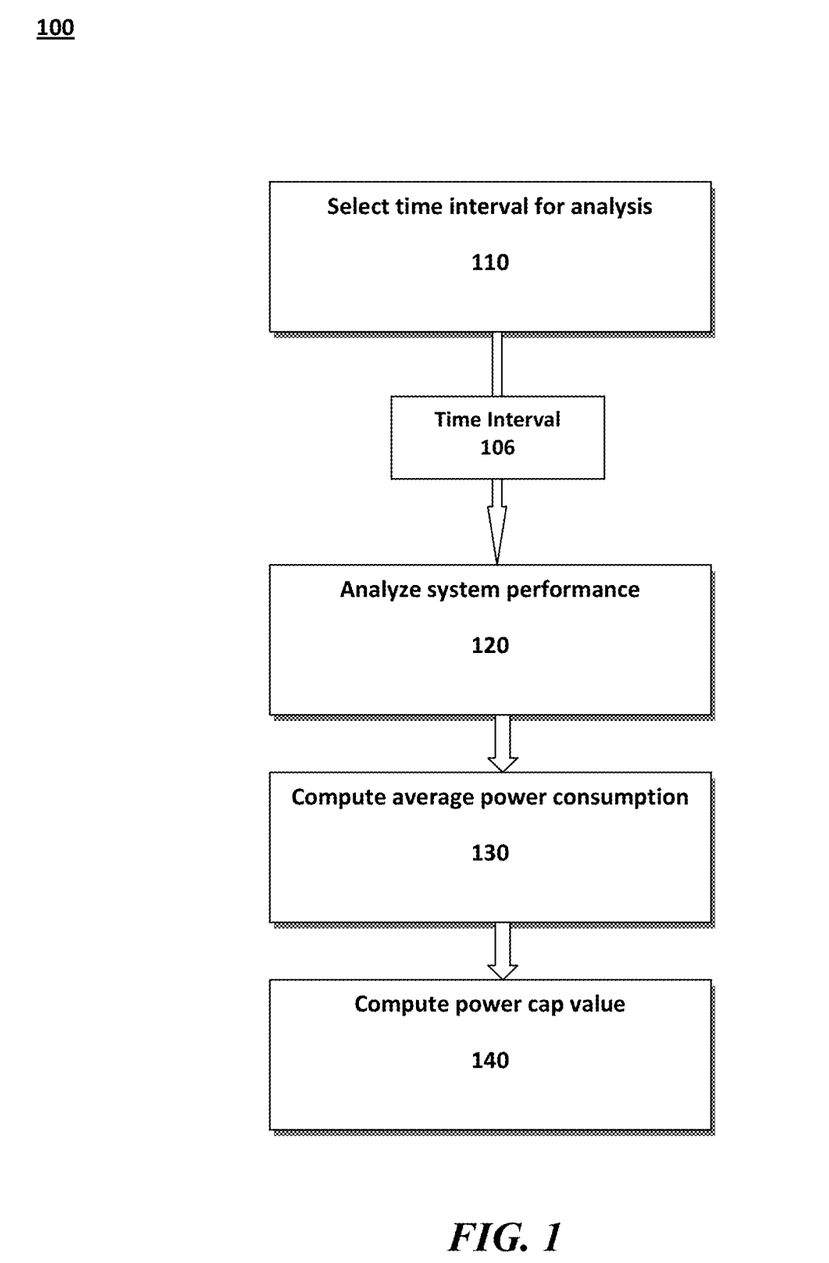
FIG. 1 is a high level flowchart of a method for power cap value suggestion that has an impact on system performance, according to an embodiment of the present invention.

Referring now to FIG. 1 in particular, we show a high level flowchart 100 of a proposed method for recommending an optimal power cap value 675, according to one embodiment of the present invention. This embodiment produces a power cap value recommendation that, if followed, will have an impact on system performance. This approach suggests the power cap value 675 using the average power consumption of the system 620 for a given time interval.

Beginning at step 110 we select a time interval for the analysis. The decision on what time interval to select should be made taking into consideration the throughput of the system 620 and the average turn-around time per transaction. The time interval can be stated in hours, days, weeks, or months. Referring to the graph of FIG. 5 we show a time interval of twenty (20) days.

Once we have selected the time interval 106, in step 120 we analyze system performance to generate a value for the average power consumption of the system. For a given time interval t1 to tn assume there are "n" average power consumption values p1 to pn provided by a power meter 610 that supports power regulator technology 660. Next in step 130 we compute the average power consumption (Pavg) during the time interval 106 using the following algorithm:

$$Pavg=(p1+p2+ \ldots pn)/n$$

In step 140, using the average power consumption value, we compute the power cap value 675.

Figure 2:
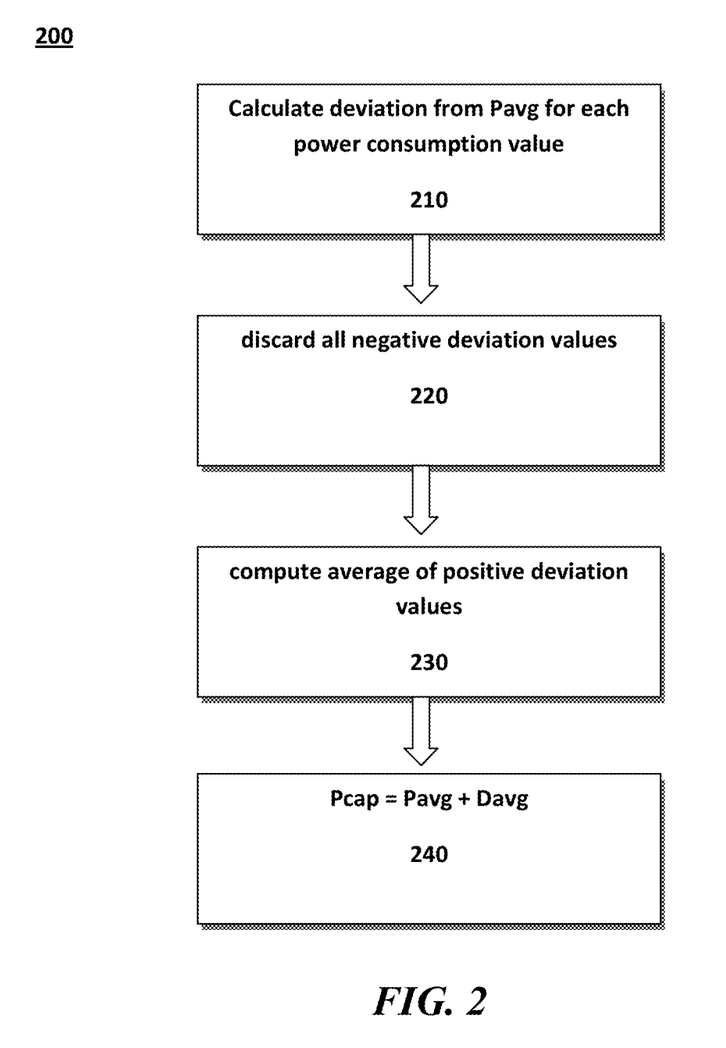
FIG. 2 is a lower level flowchart of the process for computing the power cap value of FIG. 1, according to an embodiment of the present invention.

Referring now to FIG. 2, we provide a lower-level flowchart 200 of the method steps for computing the power cap value 675 using the average power consumption value. In step 210, for each average power consumption value "p" we calculate the deviation from Pavg as:

$$d1=p1-Pavg$$

Therefore, for n samples there will be n deviation values where n=a+b; where:

a=number of positive deviation values
b=number of negative deviation values.

Next in step 220 we discard all of the negative deviation values (b).

With all of the negative deviation values discarded (now n=a), in step 230 we compute the average of positive deviation values as $$Davg=(d1+d2+ \ldots da)/a$$

In step 240, using the average deviation value, we compute the power cap value 675 as follows $$Pcap=Pavg+Davg.$$

Since the approach is based on average power consumption the power cap value 675 suggested by this method, if set on the server, can affect the system performance.

Figure 3:
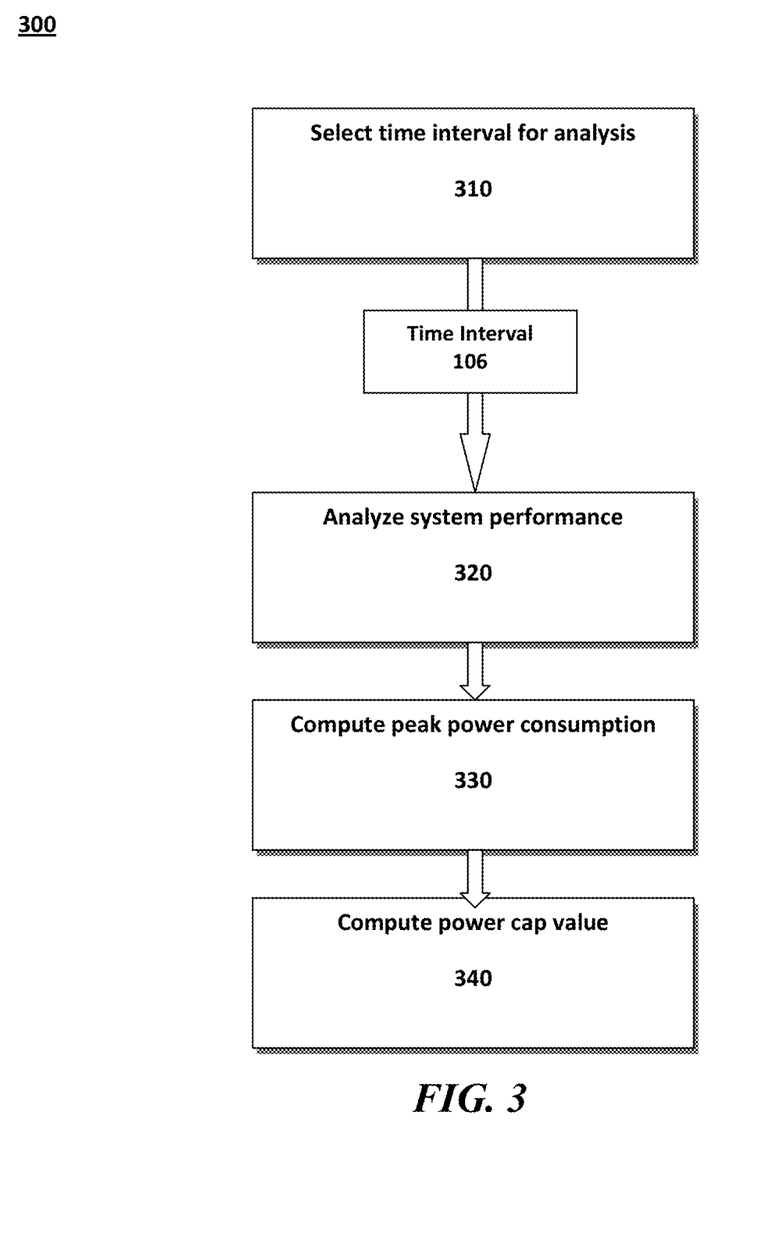
FIG. 3 is a high level flowchart of a method for power cap value suggestion that may not have an impact on system performance, according to an embodiment of the present invention.

Referring now to FIG. 3, there is shown a high-level flowchart 300 for a power cap value suggestion method that does not have an impact on system performance. As in the flowchart of FIG. 1, this method relies on the availability of a power meter 610 that supports power regulator technology 660. This approach suggests the power cap value using the peak power consumption values. Since the approach is based on peak power consumption, the power cap value suggested by this method, if set on the server, will not affect the system performance.

First in step 310, we select the time interval 106 during which the analysis takes place. Once we have selected the time interval 106, in step 320 we analyze the system performance to derive peak power consumption values, as follows:

For a given time interval t1 to tm assume there are "m" peak power consumption values p1 to pm provided by the power meter 610. In step 330 we then compute the average peak power consumption as:

$$P\text{peak}=(p1+p2+\ldots pm)/m$$

Using this computed value, we compute the power cap value in step 340. Optionally, once the power cap value is computed using real-time data, the method can automatically apply it to the system 620 using the power regulator technology 660.

Figure 4:
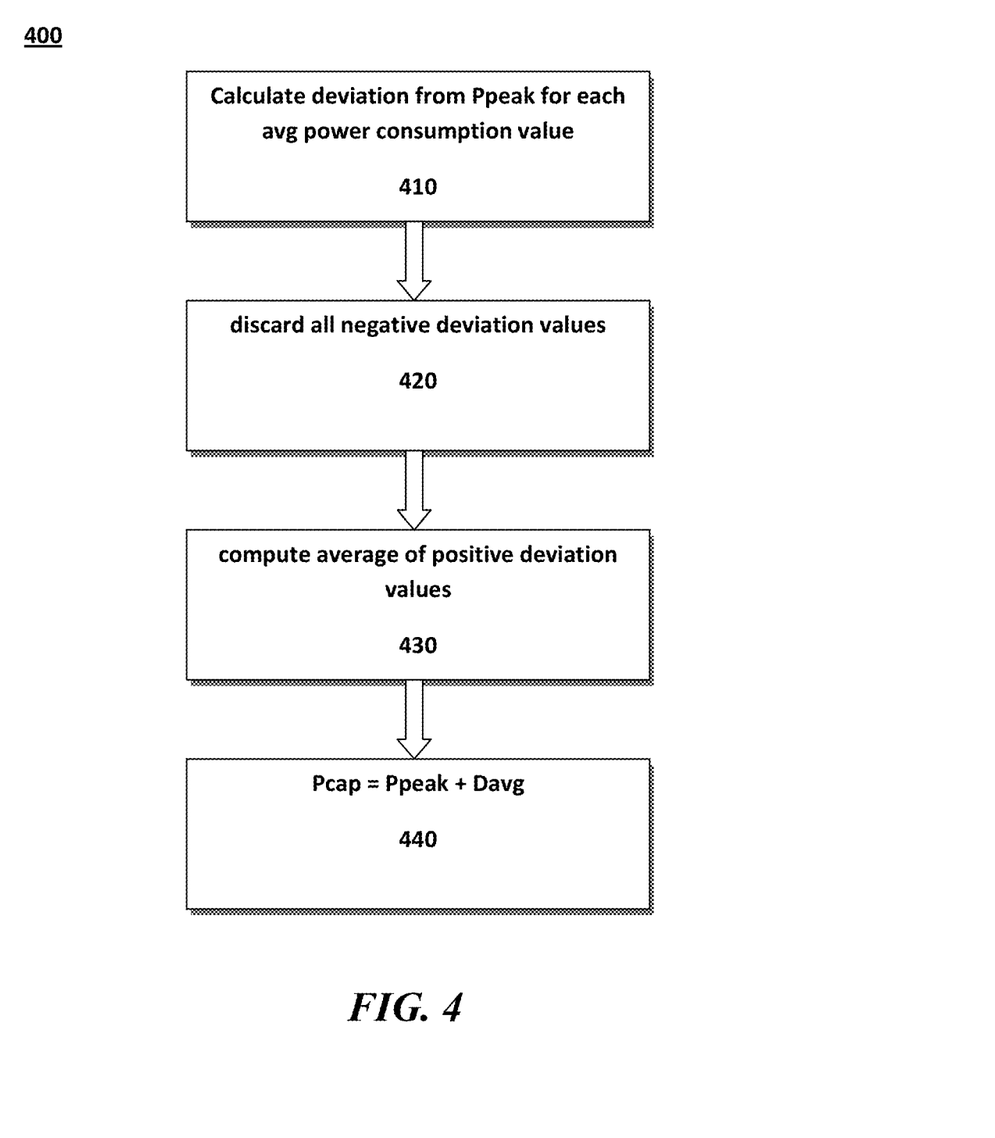
FIG. 4 is a lower level flowchart of the process for computing the power cap value of FIG. 3, according to an embodiment of the present invention.

Referring now to FIG. 4, there is shown a lower-level flowchart 400 for the method for generating the power cap value for the method of FIG. 3. In step 410, for each average power consumption value "p" we calculate the deviation from Ppeak as:

$$d1=p1-P\text{peak}$$

Therefore, for m samples there will be m deviation values where m=a+b, where:
a=number of positive deviation values.
b=negative deviation values.

In step 420, we discard all the negative deviation values. In step 430 we then compute the average of the positive deviation values as:

$$D\text{avg}=(d1+d2+\ldots da)/a$$

In step 440, using the average deviation value Davg, we calculate the power cap value as follows:

$$P\text{cap}=P\text{peak}+D\text{avg}$$

Figure 5:
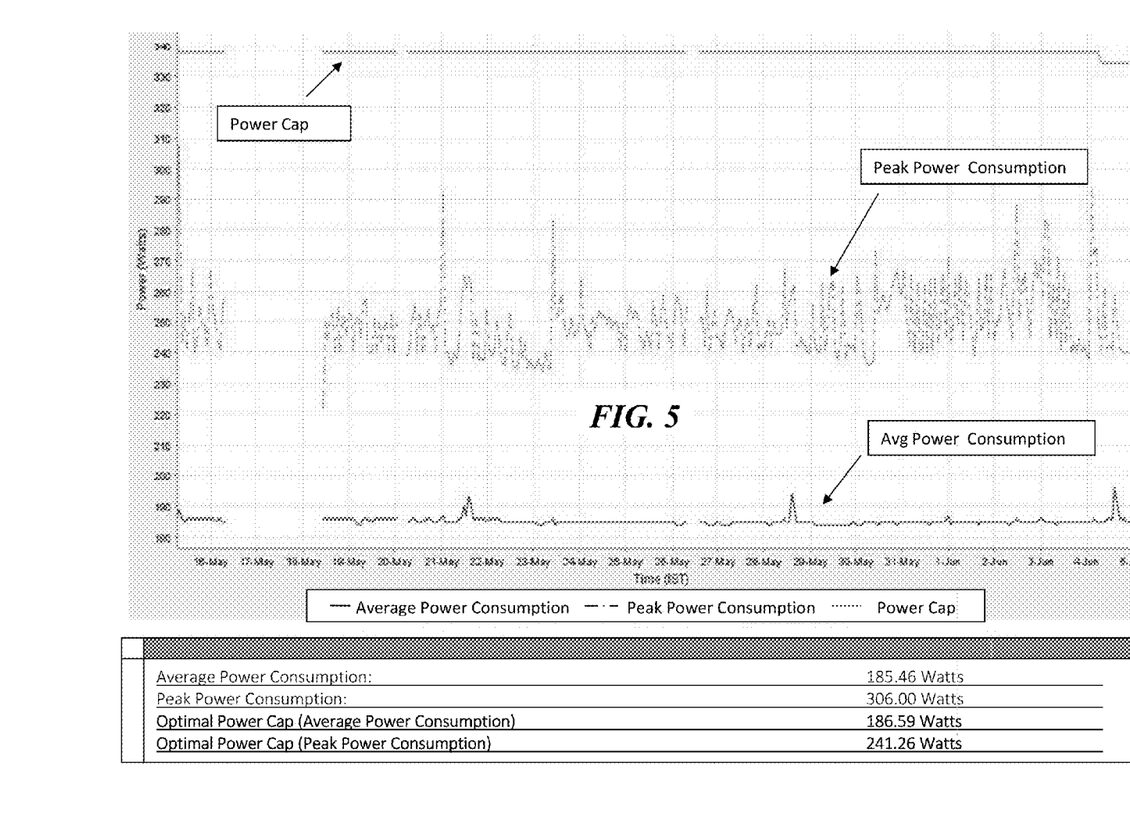
FIG. 5 shows an exemplary graph of power consumption values, according to an embodiment of the present invention.

Referring now to FIG. 5 the image shows a graph of dummy power consumption (peak & average) data for a server in a data center for a given time interval. The graph also shows a high manual power cap applied to the system. As the manual power cap value applied is high it does not affect power consumption/system performance.

Figure 7:
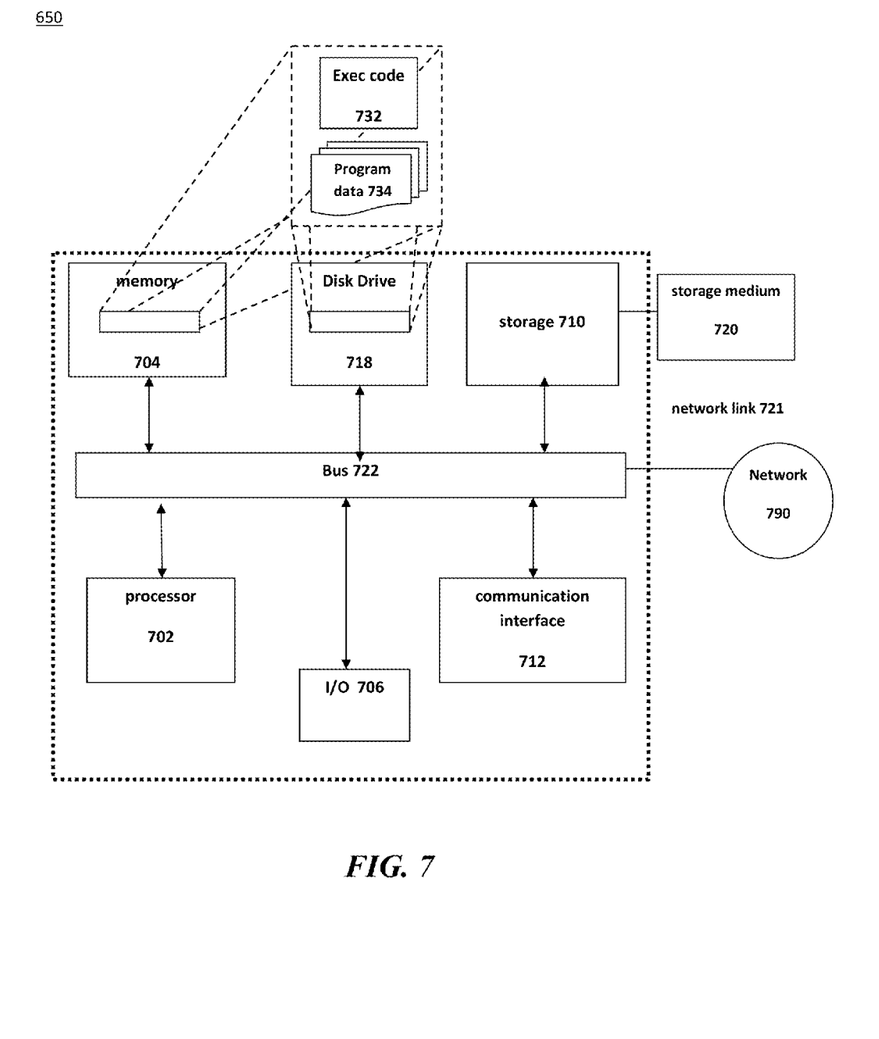
FIG. 7 is a high level block diagram showing an information processing system configured to operate according to an embodiment of the present invention.

Referring to FIG. 7, there is provided a high-level block diagram of the power cap computation engine 650, according to an embodiment of the present invention. For purposes of this invention, power cap computation engine 650 may be embodied as any type of computer, information processing system or other programmable electronic device, including a client computer, a server computer, a portable computer, a tablet computer, a mobile device, an embedded controller, a personal digital assistant, Internet TV, cloud computing device, and the like. The power cap computation engine 650 may be a stand-alone device or networked into a larger system. The power cap computation engine 650, illustrated for exemplary purposes as a networked computing device, is in communication with other networked computing devices (not shown) via network 790. As will be appreciated by those of ordinary skill in the art, network 790 may be embodied using conventional networking technologies and may include one or more of the following: local area networks, wide area networks, intranets, public Internet and the like.

The power cap computation engine 650 includes processing device 702 which communicates with an input/output subsystem 706, memory 704, storage 710 and network 790. The processor device 702 is operably coupled with a communication infrastructure 722 (e.g., a communications bus, cross-over bar, or network). The processor device 702 may be a general or special purpose microprocessor operating under control of computer program instructions 732 executed from memory 704 on program data 734. The processor 702 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

Memory 704 may include both volatile and persistent memory for the storage of: operational instructions 732 for execution by CPU 702, data registers, application storage and the like. Memory 704 preferably includes a combination of random access memory (RAM), read only memory (ROM) and persistent memory such as that provided by a hard disk drive 718. The computer instructions/applications that are stored in memory 704 are executed by processor 702. The computer instructions/applications 732 and program data 734 can also be stored in hard disk drive 718 for execution by processor device 702. Alternatively, the program data such as the values generated from the power analysis, can be stored off-site in data store 680.

The I/O subsystem 706 may include various end user interfaces such as a display, keyboard, and a mouse. The I/O subsystem 706 may further comprise a connection to a network 790 such as a local-area network (LAN) or wide-area network (WAN) such as the Internet.

The power cap computation engine 650 may also include a removable storage drive 710, representing a magnetic tape drive, an optical disk drive, and any other removable device storing digital data. The removable storage drive 710 reads from and/or writes to a removable storage unit 720 in a manner well known to those having ordinary skill in the art. Removable storage unit 720, represents a compact disc, magnetic tape, optical disk, CD-ROM, DVD-ROM, etc. which is read by and written to by removable storage drive 710. As will be appreciated, the removable storage unit 720 includes a non-transitory computer readable medium having stored therein computer software and/or data.

The power cap computation engine 650 may also include a communications interface 712. Communications interface 712 allows software and data to be transferred between the computer system and external devices. Examples of communications interface 712 may include a modem, a network interface (such as an Ethernet card), a communications port, a PCMCIA slot and card, etc. Software and data transferred via communications interface 712 are in the form of signals which may be, for example, electronic, electromagnetic, optical, or other signals capable of being received by communications interface 712.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for generating an optimal power cap value, comprising:
   using a processor device performing steps of:
      selecting a time period for analyzing power usage of an information processing system;
      analyzing the power usage of the system for the specified time period, said system supporting power regulation technology and operably coupled with a power meter;
      computing an average power consumption value for the system for the specified time period; and
      generating the optimal power cap value for the system, using the computed power consumption value, by performing:
         calculating a deviation from the average power consumption value for each recorded average power consumption value;
         discarding all negative deviation values;
         computing an average of all positive deviation values; and
         calculating the optimal power cap value as a sum of the average power consumption value and the average of the positive deviation values; and
      using the system's power regulation technology, automatically applying the generated optimal power cap value to a component of the system, when it is determined that said generated optimal power cap value is an improvement over a current power usage value.

2. The method of claim 1 further comprising a step of: presenting the generated optimal power cap value.

3. The method of claim 1 wherein computing the average power consumption value of the system during the specified time period comprises:
   recording the average daily power consumption value for each increment of time within the specified time period;
   summing the recorded average daily power consumption; and
   dividing the sum by the number of increments within the specified time period.

4. An information processing system for generating an optimal power cap value, comprising:
   a memory with computer-executable instructions stored therein, said computer-executable instructions comprising:
      selecting a time period for analyzing power usage of an information processing system;
      analyzing the power usage of the system for the specified time period, said system operably coupled with a power meter and supporting power regulation technology;
      computing an average power consumption value for the system for the specified time period; and
      generating the optimal power cap value for the system, using the computed power consumption value, by performing:
         calculating a deviation from the average power consumption value for each recorded average power consumption value;
         discarding all negative deviation values;
         computing an average of all positive deviation values; and
         calculating the optimal power cap value as a sum of the average power consumption value and the average of the positive deviation values; and
      using the system's power regulation technology, automatically applying the generated optimal power cap value to a component of the system, when it is determined that said generated optimal power cap value is an improvement over a current power usage value; and
   a processor device operably coupled with the memory, said processor device executing the computer-executable instructions.

5. The information processing system of claim 4 wherein the computer-executable instructions further comprise: presenting the generated optimal power cap value.

6. The information processing system of claim 4 wherein computing the average power consumption of the system during the specified time period comprises:
   recording average daily power consumption values for each increment of time within the time period;
   summing the recorded average daily power consumption; and
   dividing the sum by the number of increments within the specified time period.

7. A computer program product comprising a non-transitory computer-readable storage medium with computer-executable instructions stored therein, said computer-executable instructions comprising:
   selecting a time period for analyzing power usage of an information processing system;
   analyzing the power usage of the system for the specified time period, said system operably coupled with a power meter and supporting power regulation technology;
   computing an average power consumption value for the system for the specified time period; and
   generating the optimal power cap value for the system, using the computed average power consumption value, by performing:
      calculating a deviation from the average power consumption value for each recorded average power consumption value;
      discarding all negative deviation values;
      computing an average of all positive deviation values; and
      calculating the optimal power cap value as a sum of the average power consumption value and the average of the positive deviation values; and
   using the system's power regulation technology, automatically applying the generated optimal power cap value to a component of the system, when it is determined that said generated optimal power cap value is an improvement over a current power usage value.

8. The computer program product of claim 7 wherein computing the average power consumption value of the system during the specified time period comprises:
   recording average daily power consumption values for each increment of time within the time period;

summing the recorded average daily power consumption; and dividing the sum by the number of increments within the specified time period.

* * * * *